Sept. 20, 1938.   H. E. KAISER   2,130,625
PORTLAND CEMENT CLINKER QUENCHING PROCESS
Filed Sept. 20, 1937
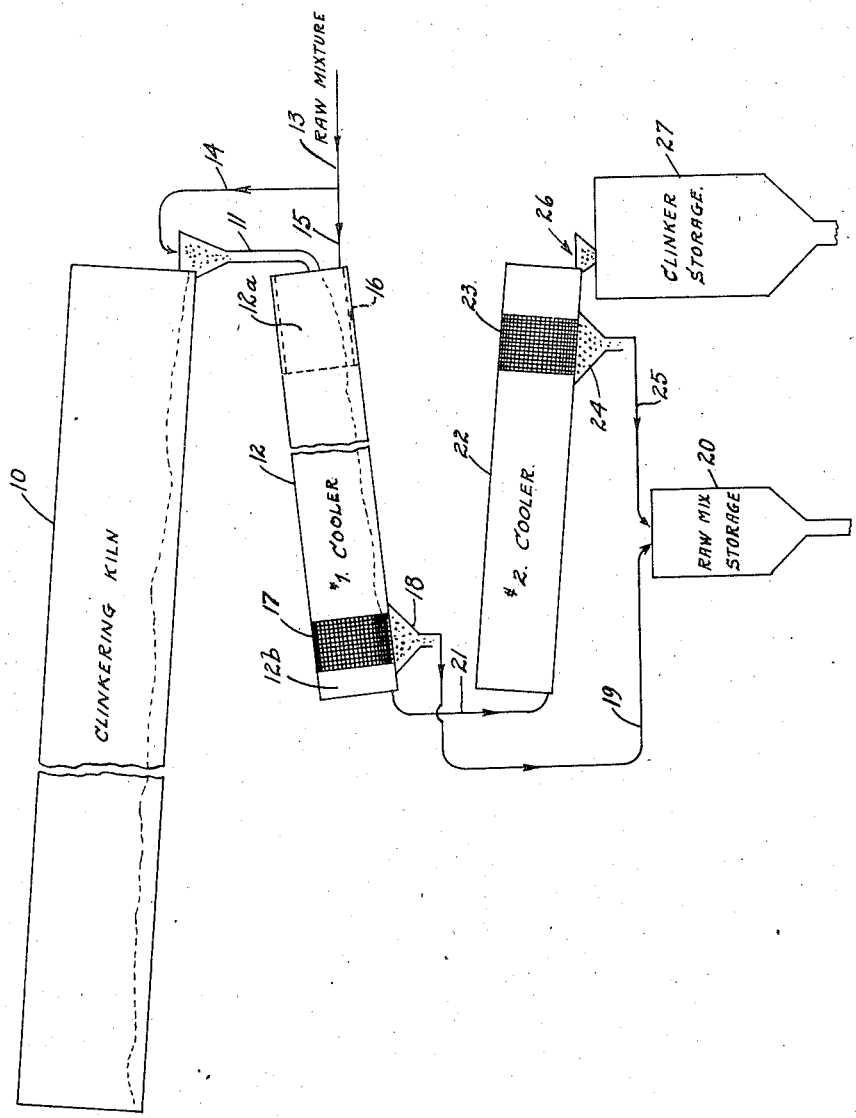
Inventor.
Harry E. Kaiser.
Attorney.

Patented Sept. 20, 1938

2,130,625

UNITED STATES PATENT OFFICE 2,130,625

PORTLAND CEMENT CLINKER QUENCHING PROCESS

Harry E. Kaiser, Colton, Calif., assignor to California Portland Cement Company, Los Angeles, Calif., a corporation of California Application September 20, 1937, Serial No. 164,687

16 Claims. (Cl. 263—53)

This invention has for its general object to provide an improved process for quenching Portland cement clinker, and is distinguished in one respect, among others, from prior clinker quenching processes in that the quenching medium comprises a ground Portland cement raw mixture. A Portland cement raw mixture may be defined as comprising a mixture of argillaceous and calcareous materials which when calcined to temperatures of incipient fusion will result in the formation of Portland cement clinker as known by accepted standards. Since the chemical composition of the Portland cement raw mixture has a direct bearing upon the effectiveness of the mixture as a medium for quenching the Portland cement clinker, raw mixtures which I propose to employ in the present process may further be defined with respect to chemical composition as containing 12.0% to 26.0% silica ($SiO_2$), or equivalent, and 70% to 85% calcium carbonate ($CaCO_3$), or equivalent, plus the usual percentages of other normal ingredients of Portland cement raw mixtures.

Considering the raw mixture specifically from the standpoint of a quenching medium, its calcium carbonate content is important with reference to the heat absorbing capacity of the raw mixture, and therefore its efficacy as a quenching material. Since it is contemplated that ordinarily a portion of the raw mixture will become heated by the clinker in the quenching operation to a temperature of incipient calcination, the heat required to cause the endothermic liberation of carbon dioxid enters into a consideration of the total heat absorbing capacity or effective specific heat of the raw mixture. This term includes other factors and, while variable in accordance with a predetermined degree of calcination, may be defined as the amount of heat required to dehydrate the mixture, raise its temperature to the point at which incipient calcination will start, and continue calcination to the desired degree. One advantage, among others, in using a Portland cement raw mixture as the quenching medium lies in the fact that its calcium carbonate content is sufficiently high to permit calcination to an extent that in effect will give the material a higher heat absorbing capacity than it would otherwise have in the absence of a comparable lime content. Calcination is promoted by reason of the presence of a large number of calcium carbonate particles in contact with the hot clinker.

In the more recent development of the art, definite advantages have been recognized to result from quenching, i. e. very rapid cooling, of Portland cement clinker. By quenching the clinker immediately or very shortly after it passes from the clinkering zone of the kiln, there is a tendency to "freeze" the equilibrium which has been set up at the clinkering temperatures among the various compounds in the clinker. It will be unnecessary to enter into a specific discussion of the individual compounds or their interrelationship and effects under equilibrium conditions; suffice to state that it has become generally recognized that by maintaining or freezing that equilibrium by rapid quenching, certain properties of the clinker itself, and of the finished cement, are definitely improved.

All the possible effects and advantages of rapid quenching have not as yet become definitely established. However, there are clear indications of beneficial results in a number of respects, and here I refer to apparent advantages determined from observations and tests of Portland cement clinker that has been quenched by sudden and intimate admixture with finely ground Portland cement raw mixture. Quenching appears to promote ease of grindability, as indicated by the fact that the quenched clinker will be reduced to a substantially finer state of division when subjected to a given grinding operation, than a normally cooled or unquenched clinker. It is also indicated that the resultant clinker will have less tendency to "dust" than normally. Further tests indicate that cementitious or concrete mixtures made with cement from the quenched clinker, show a materially lower degree of expansion under the standard tests. It is also believed that beneficial effects are had upon the properties of the clinker by subjecting the clinker to quenching and permitting it to cool within the quenching temperature range in an atmosphere of carbon dioxid, as is made possible by the invention by virtue of the calcium carbonate content of the raw mixture.

In accordance with the invention, the hot clinker is admixed with finely ground Portland cement raw mixture, preferably immediately after the clinker leaves the clinkering zone of the kiln, in order that the "freezing" effect of quenching may be had upon the clinker while it is still as close as possible to the clinkering temperature of the kiln. Any suitable quantity or proportion of relatively cold raw mixture may be admixed with the clinker that will produce the desired and proper quenching effect. Also, the raw mixture may be cold, or it may be mildly heated, so long as ample temperature differential exists between the clinker and raw mix in accordance with the proportions used. Where the process is continuous, as it usually will be, I will ordinarily introduce the ground raw mixture to the hot clinker at a rate such that the potential Portland cement quantity of the raw mixture will at least correspond substantially to the quantity of clinker admixed therewith. (By "potential Portland cement quantity" of raw mixture, I mean the quantity of Portland cement clinker that a given amount of the raw mixture will produce upon calcination at Portland cement clinker forming temperatures.) It is to be understood, however, that greater or lesser proportions of the raw mixture may be used if desired.

In order to obtain the desirable rapidity and uniformity of quenching, the raw materials and clinker are rapidly and intimately admixed in any suitable manner, for example in an elongated cylinder that is rotated to give continuous mixing agitation. With the further view of enhancing rapid quenching by promoting intimacy of contact between the raw mix and clinker particles, the raw mixture preliminarily is rather finely ground, for example to a particle size such that substantially all will pass a fifty mesh screen, and 70% to 100% will pass a two hundred mesh screen.

The admixture of clinker and raw mix is maintained in a cooling zone for a period of time required to drop the clinker temperature through the proper quenching range. Various factors may enter into the time element, but it may be stated, as illustrative, that ordinarily it will be desirable to cool the clinker from a temperature that may range between 1800 to 2600° F., to a temperature under 1000° F. within a period of eight minutes. Preferably the relative proportions of admixed clinker and raw mixture will be such that the heat of the clinker will produce some incipient calcination of the raw mixture. This will result in a liberation of carbon dioxid within the atmosphere of the cooling zone, so that the clinker cools in a reducing atmosphere with apparent beneficial effects on the properties of the clinker and cement.

After the clinker has become quenched, the raw mixture is then separated from the clinker in one or more separating or screening stages sufficient to substantially entirely free the clinker from adhering raw mixture particles. The clinker then may be ground or processed by any of the usual methods of producing Portland cement, and the separated raw mixture may be used in any desired manner. For example, after further cooling, all or a portion of the separated raw mixture may again be used as a quenching medium, or the raw mixture, preferably while in a heated condition, may be calcined to produce Portland cement clinker in the same kiln in which the quenched clinker has been formed, or in different kilns. Such subsequent disposition of the separated raw mix for use in making Portland cement clinker, more particularly is included in the subject matter of my copending application, Ser. No. 164,686, filed September 20, 1937, for Process of manufacturing Portland cement.

The foregoing description of the invention may perhaps be amplified to advantage by reference to the accompanying drawing which shows, in flow sheet form, a typical and illustrative system for carrying out the process.

Portland cement clinker formed in the clinkering kiln 10 is delivered by suitable means, conventionally illustrated by chute 11, into the upper end of an elongated cylindric cooler 12 that preferably is slowly rotated by suitable means, not shown. The finely ground Portland cement raw mixture may be fed from a conveyor line 13 through line 14 to be admixed with the hot clinker at the inlet end of chute 11 and directly after the clinker leaves the kiln, or the raw mixture may be taken via line 15 and fed into the inlet end 12a of the cooling chamber. As illustrated, the feed end of the chamber may contain a suitable refractory lining 16. The clinker and raw mixture are rapidly brought into intimate contact and subjected to thorough admixture within the rotating cooler 12. The admixture will remain in the cooler for a period of time required to quench the clinker through the proper temperature range, and as observed in the foregoing, during this time the raw mixture preferably will undergo some incipient calcination resulting in the liberation of carbon dioxid within the cooler. At the discharge end 12b of the cooler, the material passes over a perforated or screen section 17 of the cooler shell, at which point the raw mixture particles, being smaller than the pieces of clinker, pass through the screen into a hopper 18 from which the material is conveyed through line 19 to storage bin 20. For the purpose of further cooling the clinker to a temperature suitable for handling or storage, and in order to subject the clinker to any further agitation necessary to remove adhering particles of raw mixture, the clinker leaving cooler 12 may be conveyed through line 21 to a second rotating cooler 22. This cooler may also have one or more screen sections 23 through which the freed raw mixture particles will pass into hopper 24 to be conveyed via line 25 to the storage bin 20. The clean clinker finally is discharged at 26 into the clinker storage bin 27.

If for any reason it may be found advantageous to do so, cooled raw mixture may be returned from bin 20 to be used in the clinker quenching operation. Ordinarily, it will be preferred to conserve the heat contained in the separated raw mixture by utilizing the mixture, while heated, for making Portland cement clinker. But, as indicated above, that operation is more particularly dealt with in the copending application to which I have referred.

I claim:

1. The process that includes, rapidly quenching finished hot Portland cement clinker by intimately admixing with the clinker a substantially dry Portland cement raw mixture.

2. The process that includes, rapidly quenching finished hot Portland cement clinker by intimately admixing with the clinker a finely ground substantially dry Portland cement raw mixture.

3. The process that includes, rapidly quenching finished hot Portland cement clinker by intimately admixing with the clinker a heated and finely ground substantially dry Portland cement raw mixture.

4. The process that includes, rapidly quenching finished hot Portland cement clinker by admixing with the clinker a Portland cement raw mixture at a rate such that the potential Portland cement quantity of the raw mixture corresponds substantially to the quantity of clinker admixed therewith.

5. The process that includes, rapidly quenching a continuously flowing stream of finished hot Portland cement clinker by continuously introducing to and intimately admixing with the clinker a substantially dry Portland cement raw mixture.

6. The process that includes, rapidly quenching a continuous flowing stream of finished Portland cement clinker flowing from a kiln, by continuously introducing to and rapidly admixing with the clinker immediately after its removal from the kiln, a substantially dry Portland cement raw mixture and thereby rapidly cooling the clinker to a temperature below substantially 1100° F.

7. The process that includes, rapidly quenching finished hot Portland cement clinker by intimately admixing with the clinker a Portland cement raw mixture, and thereby dehydrating and artially calcining the raw mixture.

8. The process that includes, rapidly quenching a continuously flowing stream of finished hot Portland cement clinker by continuously introducing to and intimately admixing with the clinker a Portland cement raw mixture, and thereby rapidly cooling the clinker and dehydrating and partially calcining the raw mixture.

9. The process that includes, rapidly quenching finished hot Portland cement clinker by intimately admixing with the clinker a finely ground Portland cement raw mixture, and thereafter separating the raw mixture from the clinker.

10. The process that includes, rapidly quenching a continuously flowing stream of finished hot Portland cement clinker by continuously introducing to and intimately admixing with the clinker a substantially dry Portland cement raw mixture, and thereafter continuously separating the raw mixture from the clinker.

11. The process that includes, rapidly quenching finished hot Portland cement clinker by intimately admixing with the clinker a Portland cement raw mixture and maintaining the admixture in an atmosphere containing carbon dioxid released from the raw mixture.

12. The process that includes, rapidly quenching finished hot Portland cement clinker by intimately admixing with the clinker a Portland cement raw mixture, and agitating the admixture in a zone containing carbon dioxid released from the raw mixture.

13. The process that includes, discharging a stream of finished hot Portland cement clinker from a clinkering zone, then rapidly quenching all the clinker by admixing with the clinker a mixture of calcareous and argillaceous materials, and then separating said mixture from the quenched clinker.

14. The process that includes, discharging a stream of finished hot Portland cement clinker from a clinkering zone, and then rapidly quenching all the clinker by immediately admixing with the clinker a mixture of calcareous and argillaceous materials in a cooling zone, subjecting the admixture to agitation in said cooling zone, and then separating said mixture from the quenched clinker.

15. The process that includes, continuously passing a stream of finished hot Portland cement clinker from a clinkering zone, then rapidly quenching the clinker by continuously introducing to and intimately admixing with the hot clinker stream immediately after it leaves the clinkering zone, a finely ground Portland cement raw mixture, and passing the admixture through a cooling zone.

16. The process that includes, continuously passing a stream of finished hot Portland cement clinker from a clinkering zone, then rapidly quenching the clinker by continuously introducing to and intimately admixing with the hot clinker stream immediately after it leaves the clinkering zone, a finely ground Portland cement raw mixture, passing the admixture through a cooling zone, and then separating the raw mixture from the clinker.

HARRY E. KAISER.